US005732220A

United States Patent [19]
Mayfield et al.

[11] Patent Number: 5,732,220
[45] Date of Patent: Mar. 24, 1998

[54] METHOD AND APPARATUS FOR TESTING DEVICE BUS RESOURCE RESOLUTION

[75] Inventors: Brandon James Mayfield; Chris Alan Schwendiman, both of Round Rock, Tex.

[73] Assignee: International Business Machines Corporation, Armonk, N.Y.

[21] Appl. No.: 511,202

[22] Filed: Aug. 4, 1995

[51] Int. Cl.[6] .................................................. G06F 11/22
[52] U.S. Cl. .............................. 395/200.65; 395/185.09
[58] Field of Search ........................... 364/514 B, 550, 364/551.01; 371/48, 68.2, 20.1; 395/180, 182.03, 182.04, 183.19, 183.2, 185.01, 185.09, 200.65, 200.83

[56] References Cited

U.S. PATENT DOCUMENTS

| | | | |
|---|---|---|---|
| 4,570,217 | 2/1986 | Allen et al. | |
| 4,750,171 | 6/1988 | Kedar et al. | 370/445 |
| 5,261,109 | 11/1993 | Cadambi et al. | |
| 5,282,272 | 1/1994 | Guy et al. | |
| 5,420,987 | 5/1995 | Reid et al. | 395/830 |
| 5,504,904 | 4/1996 | Dayan et al. | 395/651 |

*Primary Examiner*—Emanuel T. Voeltz
*Assistant Examiner*—Thomas Peeso
*Attorney, Agent, or Firm*—Andrew J. Dillon

[57] ABSTRACT

A method and system for testing device conflict and bus resolution are disclosed. The device conflict and bus resolution is for a data processing system that uses customized device data definitions for configuration. To perform the testing for device conflict and bus resolution, the system first repopulates a device data information database found within the data processing system with customized configuration data for a predetermined system configuration to be tested. Next, the system performs a bus resolve resolution function that highlights any errors, device conflicts, or bus conflicts. Next, the system evaluates the results from the bus resolution resolve resolution function for evaluation by the tester. Before performing the repopulating function, the system removes any previously programmed customized definitions for a particular system configuration in order that a fair evaluation of the new configuration may be performed. This repopulation option begins by parsing a test control file within the data processing system for new customized definitions and then inserting a new set of customized definitions within the device database. During the evaluation, the system determines whether any error return codes have been indicated during the resolve function. Further, the evaluation function also tests for any undetected conflicts within the new customized configuration data and determines if any proper devices had been configured during the resolve function.

15 Claims, 3 Drawing Sheets

METHOD AND APPARATUS FOR TESTING DEVICE BUS RESOURCE RESOLUTION

BACKGROUND OF THE INVENTION

1. Technical Field

The present invention relates generally to data processing systems having a plurality of devices connected to a bus in the data processing system and, more particularly, to a data processing system that has limited resources being utilized by a plurality of devices on a bus line where resource resolution is a priority. More particularly still, the present invention relates specifically to a method of quickly testing any resource resolution configuration for a plurality of devices connected to a bus in a data processing system.

2. Background of the Invention

Problems associated with resolving conflicts with devices attached to a bus within a data processing system are well known. At the development stage, the device developers who intended to provide a device for a particular system platform must attach the adapter to the system, load up particular software for driving the device, and then repeat the testing with the new configuration for any possible scenario that might be expected for the new device to test system compatibility.

Unfortunately, this approach has several problems. Specifically, the need to add devices physically and to reconfigure the computer physically is time consuming. Additionally, this does not allow testing of all possible devices, but only with those devices available and their requirements for bus resources, which may or may not stress the testing to its fullest potential. Certainly, it will not be likely to test all attribute types and the various representatives for possible values and relationships between values introduced by either group or share attributes.

Moreover, the tested configurations are limited to what the test environment provides by way of integrated devices and what is available for the tester or developer to attach to the bus. Further, planned configurations cannot be easily prototyped to explore the consequences of resource selection until the hardware is exactly available. Lastly, the developer can never be sure that the maximum number of code paths are travelled during testing to resolve all potential conflicts.

Accordingly, what is needed is a device resource resolution testing approach that is able to bypass any preconfigured device configuration code and load customizeable device information according to the developers' requirements and to provide automated and standardized testing cues for bus resolution.

SUMMARY OF THE INVENTION

It is therefore an object of the present invention to provide data processing systems having a plurality of devices connected to a bus in the data processing system.

It is a further object to a data processing system that has limited resources being utilized by a plurality of devices on a bus line where resource resolution is a priority.

It is yet a further object of the present invention to provide a method of quickly testing any resource resolution configuration for a plurality of devices connected to a bus in a data processing system.

The foregoing objects are achieved as is now described. According to the present invention, a method and system for testing device conflict and bus resolution are disclosed. The device conflict and bus resolution is for a data processing system that uses customized device data definitions for configuration. To perform the testing for device conflict and bus resolution, the system first repopulates a device data information database found within the data processing system with customized configuration data for a predetermined system configuration to be tested. Next, the system performs a bus resolve resolution function that highlights any errors, device conflicts, or bus conflicts. Next, the system evaluates the results from the bus resource resolution function for evaluation by the tester.

Before performing the repopulating function, the system removes any previously programmed customized definitions for a particular system configuration in order that a fair evaluation of the new configuration may be performed. This repopulation option begins by parsing a test control file within the data processing system for new customized definitions and then inserting a new set of customized definitions within the device database. During the evaluation, the system determines whether any error return codes have been indicated during the resolve function. Further, the evaluation function also tests for any undetected conflicts within the new customized configuration data and determines if any proper devices had been configured during the resolve function.

This system and method flexibility allows a developer to develop test groups to test any "what if" test scenarios. Further, the system allows the developer to test device bus resource attribute resolutions in an automated manner that reduces the testing procedure. Since the developer can now use a test script to customize the particular configuration arrangement, run the test group, then analyze whether the complete resolution has been achieved, the developer is able to stream line the conflicts check and experiment with various configurations that are not otherwise possible due to a lack of the actual physical devices needed or used in such a configuration.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
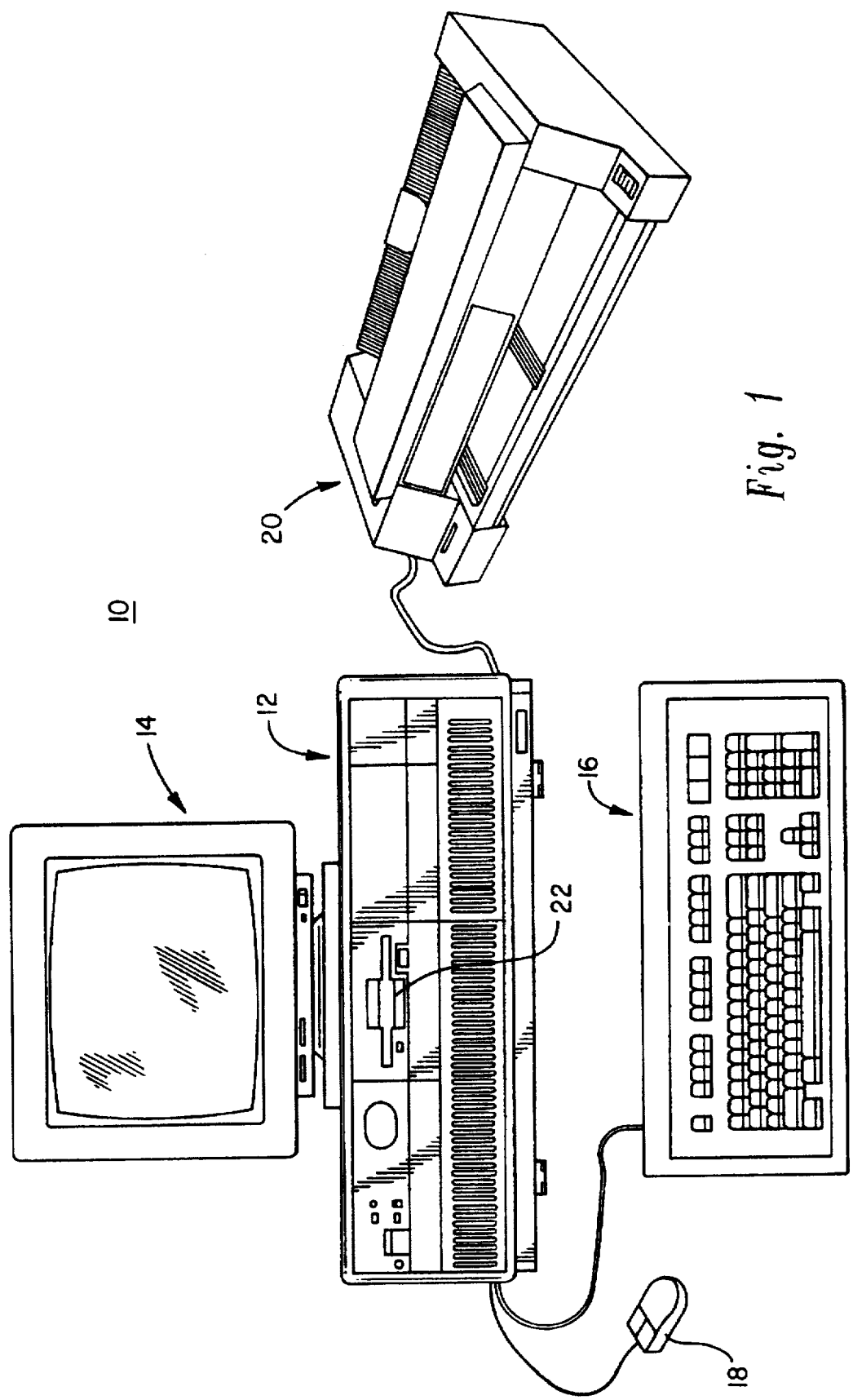
FIG. 1 depicts in accordance with a preferred embodiment of the present invention a data processing system, personal computer system, in which the present invention can be employed

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
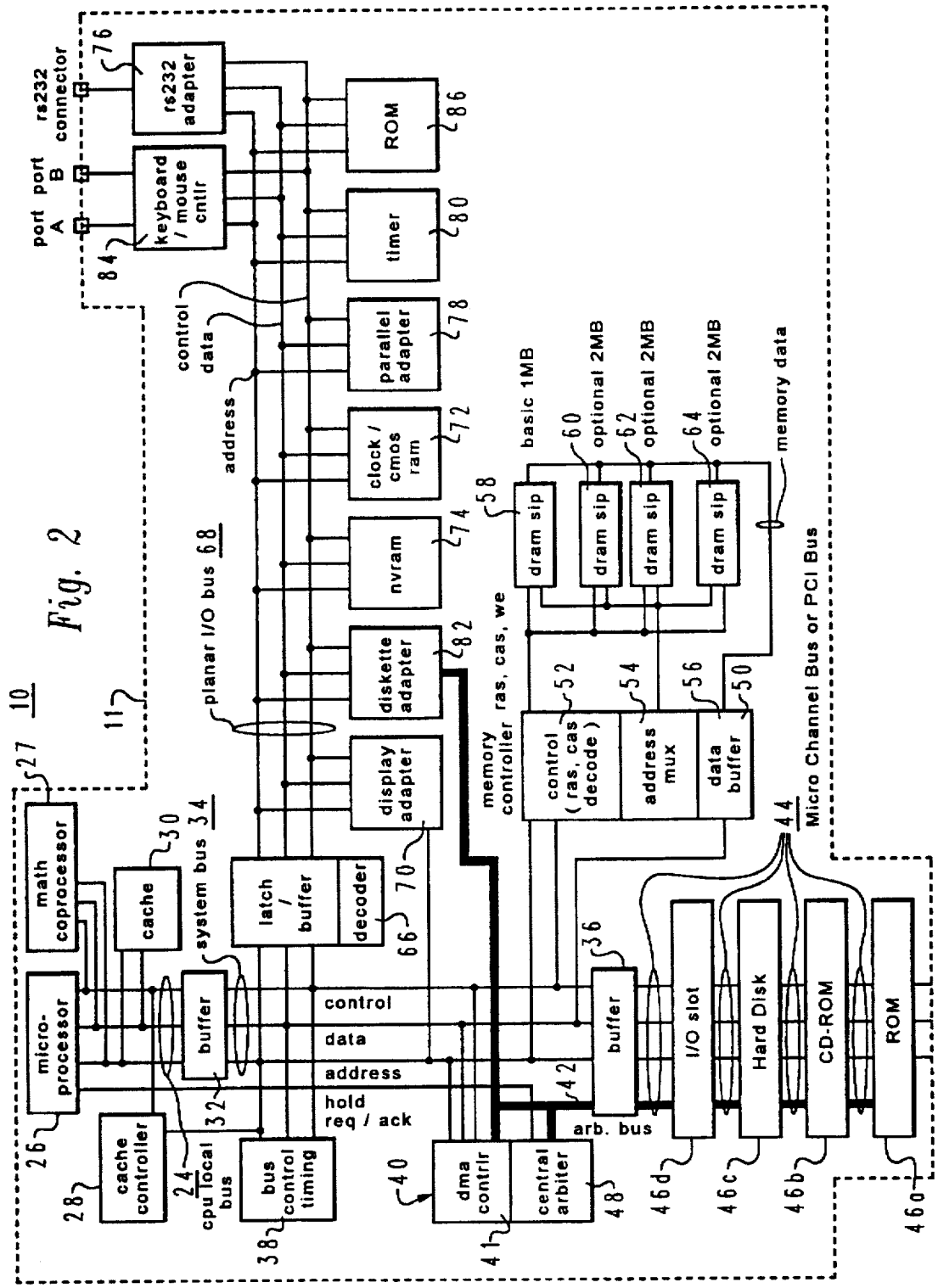
FIG. 2 is a block diagram of personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Power PC microprocessor, which is sold by IBM Corporation. "Power PC" is a trademark of IBM Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80386, 80486 or Pentium microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus. Connected to bus 44 are a plurality of I/O slots 46a–46d for receiving adapter cards, which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232; adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

In the preferred embodiment, the data processing system in FIG. 1 uses an AIX operating system, but any type of operating system that is capable of performing bus resource resolution is contemplated and the preferred embodiment is not limited to an AIX based operating system environment. What is important though, is that the operating system be able to perform bus resource resolution for resolving any potential conflicts for a variety of devices connected on a bus line, whether it be a Micro-Channel architecture bus or other standard bus typically used in the industry. A suitable, if not preferred, method of performing bus resource resolution is disclosed in a co-pending U.S. patent application entitled Method and System for Device Resource Resolution in a Data Processing System, herewith incorporated by reference for all purposes and commonly assigned to the assignee of the present invention.

The AIX operating system, which is a unit type operating system produced by International Business Machines Incorporated, uses an object data manager (ODM), which is a relational type data base system, that manages bus resource requirements for each device attached to the bus in the data processing system, whether that device is predefined or customized. Within the ODM is a customized database (CUDV/CUAT) and a predefined database (PDDV/PDAT). The predefined database contains records describing specific types of devices that may be attached to the bus. The customized database contains records describing which devices are currently attached to the bus. The ODM and device databases are described in depth in standard AIX user documentation.

During testing, the method bypasses the bus configuration code to detect devices and loads the CUDV with device information according to the desired configuration for which bus resources are to be resolved. Also, the testing method includes provisions for the user to add new device descriptions and bus resource requirements and, subsequently, detect the new devices and add them to the CUDV. The injection of contrived device requirements allows a developer to (1) stress the bus resource resolution system and (2) verify a proposed set of device requirements against existing sets of device requirements. Further, the testing method is capable of defining a suite of test conditions based on predefined definitions that can be augmented by the developer. The test method runs through multiple test suites and is also capable of selecting a single test from the suite or suites.

Additionally, the developer can selected detailed debug outputs from the bus resource resolution algorithm from the command line for either a single test or an entire test suite. A test program is developed by the developer in order to establish performance data for each test to be performed automatically.

Figure 3:
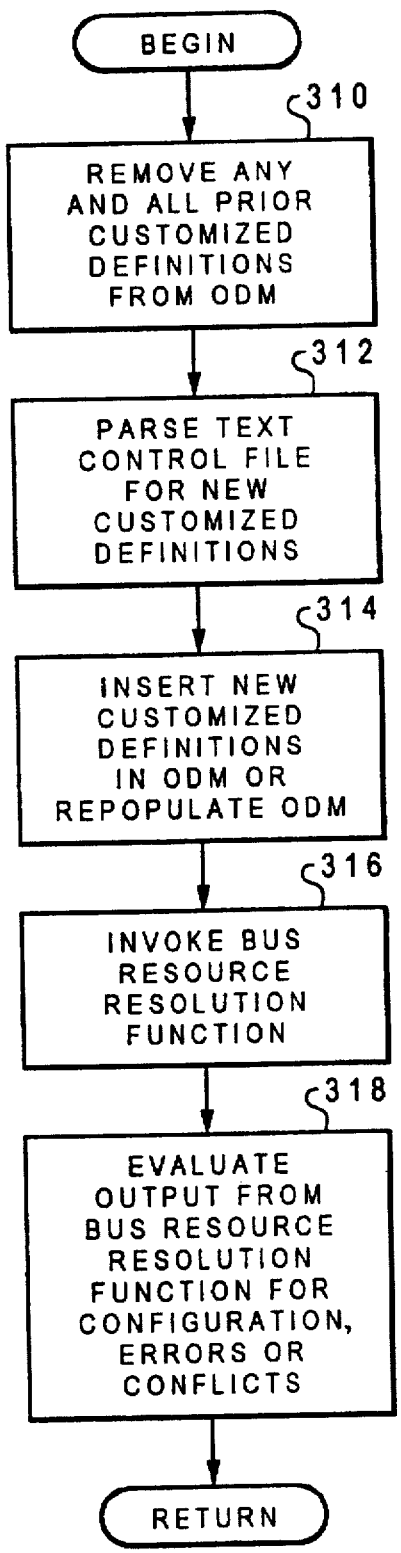
FIG. 3 depicts the implementation of the bus resolve resolution test method.

The implementation of the bus resolve resolution test method is illustrated in the flow diagram of FIG. 3. According to FIG. 3, the system, in Block 310, removes any prior customized definitions from the ODM. This includes removing all current device information from the ODM's customized attributes file and from the customized device data bases. In this step, any predefined information stored in the ODM is unaffected. Next, in Block 312, the system parses the text control file for new customized definitions. Then, in Block 314, the system inserts any new customized definitions in the ODM. Essentially, the system, at this stage, has repopulated the ODM with a customized configuration data for the particular configuration that is to be tested.

Once the ODM has been repopulated, the system, in Block 316, invokes the bus resolve function as taught and described in previously recited, co-pending U.S. patent application. At this stage, the bus resolve resolution program attempts to resolve the bus resource attributes for the particular configuration being tested. Finally, in Block 318, the system evaluates the output from the bus resolve resolution function. At this stage, the system determines if the proper devices were configured, what, if any error return code, has been indicated, and if any undetected conflicts during the test existed in the customized attributes data base.

The flexibility of the system described above allows a developer to develop test scripts to test any "what if" test scenario, which may be as complicated as any otherwise faced for the devices to be resolved. Additionally, the system allows the developer to test device bus resource attribute resolution in an automated, less time consuming manner than previously possible. Specifically, the developer no longer must attach specific adapters to the bus line on various machine platforms and then boot the platform or system to determine if the devices attributes are resolved satisfactorily. Now, the developer can use the test script to customize the particular scenario, run the test script, and then analyze whether complete resolution has been achieved, and if not, what conflicts currently exist.

While the invention has been particularly shown and described with reference to a preferred embodiment, it will be understood by those skilled in the art that various changes in form and detail may be made therein without departing from the spirit and scope of the invention.

We claim:

1. A method for testing device conflict and bus resolution in a data processing system according to a customized device data definition comprising:

parsing a text control file within said data processing system for new customized definitions for proposed adapter devices;

modifying a device data information database within said data processing system by inserting a new set of customized definitions within said device data information database for a predetermined system configuration including said proposed adapter devices;

performing a bus resolve resolution function upon said modified device data information database;

evaluating any results from said bus resolve resolution function.

2. The method according to claim 1 further comprising the step of:

prior to modifying a device data information database, removing any previously programmed customized definitions for a particular system configuration.

3. The method according to claim 1, wherein said evaluating step further comprises the step of:

determining whether any error return codes had been indicated during said bus resolution resolve function.

4. The method according to claim 1, wherein said evaluating step further comprises the step of:

testing for any undetected conflicts within said modifying device data information database.

5. The method according to claim 1, wherein said evaluating step further comprises the step of:

determining if any proper devices were configured.

6. An apparatus for testing device conflict and bus resolution in a data processing system according to a customized device data definition comprising:

means for parsing a text control file within said data processing system for new customized definitions for proposed adapter devices;

means for modifying a device data information database within said data processing system by inserting a new set of customized definitions within said device data information database for a predetermined system configuration including said proposed adapter devices;

means for performing a bus resolve resolution function upon said modified device data information database;

means for evaluating any results from said bus resolve resolution function.

7. The apparatus according to claim 6 further comprising:

means for removing any previously programmed customized definitions for a particular system configuration from said device data information database.

8. The apparatus according to claim 6, wherein said evaluating means for comprises:

means for determining whether any error return codes had been indicated during said bus resolution resolve function.

9. The apparatus according to claim 6, wherein said evaluating means further comprises:

means for testing for any undetected conflicts within said modified device data information database.

10. The apparatus according to claim 6, wherein said evaluating means further comprises:

means for determining if any proper devices were configured.

11. A computer program product for use with a graphics display device, said computer program comprising:

a computer usable medium having computer readable code means for testing device conflict and bus resolution in a data processing system according to a customized device data definition further comprising:

computer readable program code means for parsing a text control file within said data processing system for new customized definition for proposed adapter devices;

computer readable program code means for modifying a device data information database within said data processing system by inserting a new set of customized definitions within said device data information database for a predetermined system configuration including said proposed adapter devices; and computer readable code means for causing a computer to perform a bus resolve resolution function.

12. The computer program product according to claim 11 further comprising:

computer readable program code means for causing a computer to remove any previously programmed customized definitions for a particular system configuration from said device data information database.

13. The computer readable program product according to claim 11 further comprising computer readable program code means for causing a computer to determine whether any error return codes had been indicated during said bus resolution resolve function.

14. The computer program product of claim 11 further comprising computer readable program code means for causing a computer to test for any undetected conflicts within said modified device data information database.

15. The computer program product according to claim 11 further comprising:

computer readable program code means for causing a computer to determine if any proper devices were configured.

* * * * *